(12) United States Patent
Essiambre et al.

(10) Patent No.: US 10,601,521 B2
(45) Date of Patent: Mar. 24, 2020

(54) COHERENT OPTICAL COMMUNICATION WITH CONSTELLATIONS HAVING COORDINATES ON CIRCLES

(71) Applicant: Nokia Solutions and Networks Oy, Espoo (FI)

(72) Inventors: Rene-Jean Essiambre, Red Bank, NJ (US); Roland Ryf, Aberdeen, NJ (US); Muralidharan Kodialam, Marlboro, NJ (US)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 15/979,376

(22) Filed: May 14, 2018

(65) Prior Publication Data

US 2019/0349090 A1 Nov. 14, 2019

(51) Int. Cl.
*H04B 10/516* (2013.01)
*H04B 10/61* (2013.01)
*H04J 14/06* (2006.01)

(52) U.S. Cl.
CPC ......... *H04B 10/613* (2013.01); *H04B 10/614* (2013.01); *H04B 10/6166* (2013.01); *H04J 14/06* (2013.01)

(58) Field of Classification Search
CPC .................... H04B 10/516; H04B 10/5161
See application file for complete search history.

(56) References Cited

U.S. PATENT DOCUMENTS

RE40,078 E 2/2008 Dutta et al.
8,792,324 B2 7/2014 Petrov et al.
(Continued)

FOREIGN PATENT DOCUMENTS

JP 2016-144199 A 8/2016

OTHER PUBLICATIONS

A.D. Ellis, "The nonlinear Shannon limit and the need for new fibres", Nonlinear Optics and Applications VI, edited by Benjamin J. Eggleton, Alexander L. Gaeta, Neil G. Broderick, Proc. of SPIE, vol. 8434, 83434OH-1, (2012) 10 pages.
(Continued)

*Primary Examiner* — Shi K Li
(74) *Attorney, Agent, or Firm* — Nokia Technologies Oy

(57) ABSTRACT

An optical data receiver includes optical hybrids, light detectors and a digital signal processor. Each optical hybrid outputs mixtures of a corresponding one of the polarization components of a received data-modulated optical carrier with reference light. Each light detector outputs digital measurements of the mixtures from a corresponding one of the optical hybrids. The digital signal processor identifies data symbols of a constellation having parts transmitted on both polarization components of the data-modulated optical carrier responsive to receipt of the digital measurements. The transmitted data-modulated optical carrier has about a same total light intensity in each modulation time slot thereof. Each data symbol is defined by in-phase and quadrature-phase electric field coordinates of both polarization components. Pairs of in-phase and quadrature-phase electric coordinates of each of the polarization components are on a preselected set of one or more concentric circles about an origin. The constellation has 4D dimensions, D being an integer.

25 Claims, 3 Drawing Sheets

(56) References Cited

U.S. PATENT DOCUMENTS

| | | | |
|---|---|---|---|
| 9,584,259 B2 | 2/2017 | Millar et al. | |
| 9,621,275 B2 | 4/2017 | Kojima et al. | |
| 9,806,739 B1 | 10/2017 | Kojima et al. | |
| 2011/0085624 A1* | 4/2011 | Djordjevic | H04B 10/532 375/341 |
| 2012/0263466 A1* | 10/2012 | Djordjevic | H04B 10/2581 398/65 |
| 2013/0177306 A1 | 7/2013 | Pfau | |
| 2013/0336649 A1 | 12/2013 | Essiambre et al. | |
| 2015/0095743 A1* | 4/2015 | Sato | H03M 13/353 714/774 |
| 2015/0195045 A1* | 7/2015 | Zhuge | H04B 10/532 398/184 |
| 2016/0006515 A1* | 1/2016 | Kojima | H04B 10/508 398/193 |
| 2018/0269983 A1* | 9/2018 | Karar | H04B 10/614 |

OTHER PUBLICATIONS

Soumya Sunder Dash et al., "Approaching the Shannon Limit Through Constellation Modulation", Optical Fiber Communications 2016, OFC 2016, paper TH2A.46, 3 pages.

A.D Ellis et al, "Approaching the Non-Linear Shannon Limit", Journal of Lightwave Technology 11648-2009.RI, 2009-2010, pp. 1-12.

K. Kojima et al, "Nonlinearity-tolerant Modulation Formats for Coherent Optical Communications", Mitsubishi Electric Research Laboratories, Inc., 2017, InTEch Open Book, doc. TR2017-197, 22 pages, Cambridge, MA.

K. Kojima et al, "Comparison of nonlinearity tolerance of modulation formats for subcarrier modulation", Optical Fiber Communications Conference, Mar. 11-15, 2018, San Diego, CA., paper M2C.4.pdf, 3 pages.

K. Kojima et al, "Nonlinearity-Tolerant Four-Dimensional 2A8PSK Family for 5-7 Bits/Symbol Spectral Efficiency", Journal of Lightwave Technology, vol. 35, No. 8, Apr. 16, 2017, pp. 1383-1391.

A.D. Shiner et al, "Demonstration of an 8-dimensional modulation format with reduced inter-channel nonlinearities in a polarization multiplexed coherent system", Optics Express, vol. 22, No. 17, pp. 20366-20374, Aug. 2014.

Rene-Jean Essiambre et al, "Capacity Limits of Optical Fiber Networks", Journal of Lightwave Technology, vol. 28, No. 4, Feb. 15, 2010, pp. 662-701.

K. Kojima et al, "Constant Modulus 4D Optimized Constellation Alternative for DP-8QAM" ECOC 2014 European Conference, Sep. 21-25, 2014, Cannes, France, Paper P.3.25, 3 pages.

Johnny Karout et al, "Achievable Rates of Multidimensional Multisphere Distributions" OFC 2017, Optical Society of America 2017, paper W4A.4.pdf, 3 pages.

Rene-Jean Essiambre et al, "Capacity Limits of Information Transport in Fiber-Optic Networks" Physical Review Letters, vol. 101, Oct. 2008, pp. 163901-1 through 163901-4.

Johnny Karout et al, "Achievable Rates of Multidimensional Multisphere Distributions" Presentation at OFC 2017, ppt presentation nokia. pdf, 12 pages.

D. Marcuse et al, "Application of the Manakob-PMD equation to studies of signal propagation in optical fibers with randomly varying birefringence," J. Lightwave Technol., vol. 15, No. 9, pp. 1735-1746, 1997.

A. Mecozzi et al, "Nonlinear propagation in multi-mode fibers iin th strong coupling regime," Opt, Express, vol. 20, No. 11, pp. 11673-11678, 2012.

S. Mumtaz et al, "Spatially multiplexed transmission iin multicore fibers: Role of core coupling on system performance," Opt. Soc. A. Frontier in Optics, 2012, 2 pages, paper FWID.2.pdf.

L- F. Wei, "Trellis-coded modulation with multidimensional constellations," IEEE Trans Inf. Theory, vol. 33, No. 4, pp. 483-501. 1987.

Extended European Search Report received for corresponding European Patent Application No. 19173985.3, dated Sep. 25, 2019, 8 pages.

C.E. Shannon, "Probability of Error for Optimal Codes in a Gaussian Channel," The Bell System Technical Journal, vol. 38, No. 3, pp. 611-633, May 1959.

C.E. Shannon, "Probability of Error for Optimal Codes in a Gaussian Channel," The Bell System Technical Journal, vol. 38, No. 3, pp. 634-656, May 1959.

T.M. Cover and J.A. Thomas, Elements of Information Theory, 2nd Edition., John Wiley & Sons, Inc., 1991, cover page, Wiley Series in Communications page, Authors/Publisher page, copyright page, dedication page, vii-x, xi-xii, xiii-xviii, xix-xxii,title page, pp. 1-72.

T.M. Cover and J.A. Thomas, Elements of Information Theory, 2nd Edition., John Wiley & Sons, Inc., 1991, cover page, Wiley Series in Communications page, Authors/Publisher page, copyright page, dedication page, vii-x, xi-xii, xiii-xviii, xix-xxii,title page, pp. 73-166.

T.M. Cover and J.A. Thomas, Elements of Information Theory, 2nd Edition., John Wiley & Sons, Inc., 1991, cover page, Wiley Series in Communications page, Authors/Publisher page, copyright page, dedication page, vii-x, xi-xii, xiii-xviii, xix-xxii,title page, pp. 167-261.

T.M. Cover and J.A. Thomas, Elements of Information Theory, 2nd Edition., John Wiley & Sons, Inc., 1991, cover page, Wiley Series in Communications page, Authors/Publisher page, copyright page, dedication page, vii-x, xi-xii, xiii-xviii, xix-xxii,title page, pp. 262-356.

T.M. Cover and J.A. Thomas, Elements of Information Theory, 2nd Edition., John Wiley & Sons, Inc., 1991, cover page, Wiley Series in Communications page, Authors/Publisher page, copyright page, dedication page, vii-x, xi-xii, xiii-xviii, xix-xxii,title page, pp. 357-450.

T.M. Cover and J.A. Thomas, Elements of Information Theory, 2nd Edition., John Wiley & Sons, Inc., 1991, cover page, Wiley Series in Communications page, Authors/Publisher page, copyright page, dedication page, vii-x, xi-xii, xiii-xviii, xix-xxii,title page, pp. 451-542.

\* cited by examiner

50

COHERENT OPTICAL COMMUNICATION WITH CONSTELLATIONS HAVING COORDINATES ON CIRCLES

BACKGROUND

Technical Field

The invention relates to coherent optical communications.

Related Art

This section introduces aspects that may be help to facilitate a better understanding of the inventions. Accordingly, the statements of this section are to be read in this light and are not to be understood as admissions about what is prior art or what is not prior art.

The quality of the transmission of information over many types of communication channels, e.g., wireless, wired, and optical fiber channels, typically depends on the constellations of data symbols used to transmit the information in the presence of noise. The quality of such transmission of information is also subject to other specific channel impairments, which can be largely compensated. Nevertheless, such constellations and compensation schemes result in the transmission of information constrained by the Shannon limit due to the presence of additive Gaussian white noise (AGWN).

With respect to optical communication over optical fibers, information transmission can be negatively impacted by two important phenomena, AGWN, e.g., produced by optical amplifiers, and nonlinear optical distortions produced in optical fibers.

SUMMARY OF SOME ILLUSTRATIVE EMBODIMENTS

Various embodiments provide apparatus and methods that can mitigation some of the undesired affects caused by additive Gaussian white noise (AGWN) and nonlinear optical distortions to the data symbol stream being optically transmitted. These embodiments are configured for polarization multiplexed, coherent optical communication based on constellations of data symbols whose values may also be less complex to modulate onto optical carriers and/or may also be less complicated to demodulate from such data-modulated optical carriers.

In first embodiments, an apparatus includes a coherent optical data receiver including two optical hybrids, two light detectors and a digital signal processor (DSP). Each optical hybrid outputs mixtures of a corresponding one of the polarization components of a received data-modulated optical carrier with reference light. Each light detector outputs digital measurements, at a sequence of times, of the mixtures from a corresponding one of the optical hybrids. The digital signal processor is configured to identify a sequence of data symbols of a constellation having parts transmitted on both polarization components of the data-modulated optical carrier in response to receipt of the digital measurements. The transmitted data-modulated optical carrier has about a same total light intensity in each optical modulation time slot thereof. Each data symbol is defined by in-phase and quadrature-phase electric field coordinates of both polarization components. Pairs of in-phase and quadrature-phase electric field coordinates of each of the polarization components of the data symbols for each optical modulation time slot are located on a preselected set of one or more concentric circles about an origin. The constellation has four times an integer number of dimensions.

In any first embodiments, for at least one of the pairs of in-phase and quadrature-phase electric field coordinates of each of the polarization components the preselected set may include at least three or at least four of the concentric circles.

In any of the first embodiments, each data symbol may have parts on two or more consecutive ones of the optical modulation time slots. In some such embodiments, for at least one of the pairs of in-phase and quadrature-phase electric field coordinates of each polarization component, the set may include at least three or at least four of the concentric circles.

In any of the first embodiments, the pair of in-phase and quadrature-phase electric field coordinates of the different polarization components of individual ones of the data symbols may be on circles with different size diameters.

In any of the first embodiments, some of the data symbols may have pairs of in-phase and quadrature-phase electric field coordinates of the one polarization component at adjacent points on one of the circles and also have pairs of in-phase and quadrature-phase electric field coordinates of the other polarization component at or near diametrically opposite points on another of the circles of different size diameter.

In any of the first embodiments, the constellation may have data symbols in which a pair of in-phase and quadrature-phase electric field coordinates of the one polarization component is on one of the circles and pairs of in-phase and quadrature-phase electric field coordinates of the other polarization component are at or near diametrically opposite points on another of the circles of different size diameter.

In any of the above embodiments, the first apparatus may further include a coherent optical data transmitter having two in-phase and quadrature-phase optical data modulators and an electronic driver configured to electrically drive said optical data modulators to generate the transmitted data symbols of the constellation.

A second embodiment of an apparatus includes coherent optical data transmitter. The transmitter includes two in-phase and quadrature-phase optical data modulators to modulate an optical carrier, a polarization combiner to combine the modulated optical carriers from the optical data modulators into a polarization multiplexed, data-modulated optical carrier, and an electronic driver connected to electrically drive said optical data modulators according to a constellation for which data symbols have parts transmitted on both polarization components of the data-modulated optical carrier. The transmitted data-modulated optical carrier has about a same total light intensity in each optical modulation time slot of the optical data modulators. Pairs of the in-phase and quadrature-phase coordinates of each of the polarization components of the data symbols are located on a preselected set of one or more concentric circles about an origin. The constellation has four times an integer number of dimensions.

In any of the second embodiments, for at least one of the pairs of in-phase and quadrature-phase electric field coordinates of each of the polarization components the preselected set may include at least three or at least four of the concentric circles.

In any of the second embodiments, each data symbol may have parts on two or more consecutive ones of the optical modulation time slots. In some such embodiments, for the pairs of in-phase and quadrature-phase electric field coordinates of each of the polarization components the preselected set may include at least three or at least four of the concentric circles.

In any of the second embodiments, the pair of in-phase and quadrature-phase electric field coordinates of the different polarization components of individual ones of the data symbols may be on circles with different size diameters.

In any of the second embodiments, some of the data symbols may have pairs of in-phase and quadrature-phase electric field coordinates of the one polarization component at adjacent points on one of the circles and also have pairs of in-phase and quadrature-phase electric field coordinates of the other polarization component at or near diametrically opposite points on another of the circles.

In any of the second embodiments, the constellation may have data symbols in which a pair of in-phase and quadrature-phase electric field coordinates of the one polarization component is on one of the circles and pairs of in-phase and quadrature-phase electric field coordinates of the other polarization component are at or near diametrically opposite points on another of the circles.

In third embodiments, a coherent optical data receiver includes two optical hybrids, two light detectors and a digital signal processor. Each optical hybrid is configured to output mixtures of a corresponding one of the polarization components of a received data-modulated optical carrier with reference light. Each light detector is configured to output digital measurements of the mixtures at a sequence of times from a corresponding one of the optical hybrids. The digital signal processor is configured to identify a sequence of data symbols of a constellation having parts transmitted on both polarization components of the data-modulated optical carrier in response to receipt of the digital measurements. The transmitted data-modulated optical carrier has about a same total light intensity in each optical modulation time slot thereof. Each data symbol is defined by in-phase and quadrature-phase electric field coordinates of both polarization components. The constellation has four times an integer number of dimensions with the integer being greater than one. Each data symbol has parts on two or more consecutive ones of the optical modulation time slots.

In any of the third embodiments, each data symbol may have parts on three or more consecutive ones of the optical modulation time slots.

In any of the third embodiments, some of the data symbols of the constellation may have X-polarization I-Q-coordinates and Y-polarization component I-Q-coordinates, for at least one optical modulation time slot, located at points of a 3-dimensional sphere about an origin of the coordinates for the at least one optical modulation time slot with the points not located on a preselected set of tori about an origin of the coordinates.

In fourth embodiments, a coherent optical data transmitter includes two in-phase and quadrature-phase optical data modulators to modulate an optical carrier, a polarization combiner to combine the modulated optical carriers from the optical data modulators into a polarization multiplexed, data-modulated optical carrier, and an electronic driver connected to electrically drive said optical data modulators according to a constellation for which data symbols have parts transmitted on both polarization components of the data-modulated optical carrier. The transmitted data-modulated optical carrier has about a same total light intensity in each optical modulation time slot of the optical data modulators. The constellation has four times an integer number of dimensions with the integer being greater than one. Each data symbol has parts on two or more consecutive ones of the optical modulation time slots.

In any of the fourth embodiments, each data symbol may have parts on three or more consecutive ones of the optical modulation time slots.

In any of the fourth embodiments, some of the data symbols of the constellation may have X-polarization I-Q-coordinates and Y-polarization component I-Q-coordinates, for at least one optical modulation time slot, located at points of a 3-dimensional sphere about an origin of the coordinates for the at least one optical modulation time slot with the points not located on a preselected set of tori.

Figure 1:
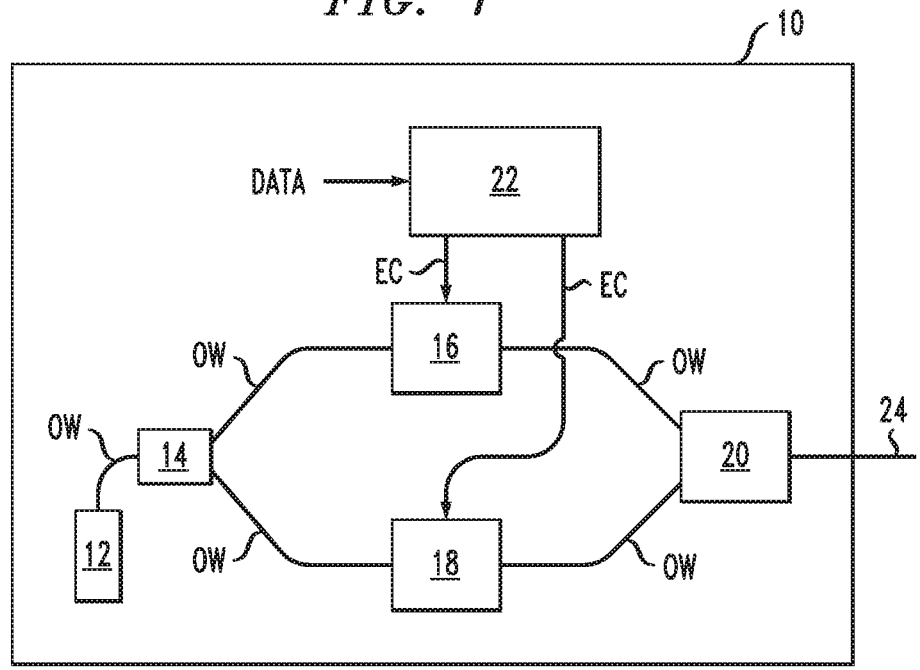
FIG. 1 is a block diagram schematically illustrating an embodiment of an optical data transmitter.

In the Figures, relative dimension(s) of some feature(s) may be exaggerated to more clearly illustrate the feature(s) and/or relation(s) to other feature(s) therein.

In the various Figures, similar reference numbers may be used to indicate similar structures and/or structures with similar functions.

Herein, various embodiments are described more fully by the Figures and the Detailed Description of Illustrative Embodiments. Nevertheless, the inventions may be embodied in various forms and are not limited to the embodiments described in the Figures and the Detailed Description of Illustrative Embodiments.

DETAILED DESCRIPTION OF ILLUSTRATIVE EMBODIMENTS

Herein, to simplify the description, first and second optical propagating modes of an optical fiber, which only significantly differ by having locally orthogonal polarizations, will be referred to as respective first and second orthogonal polarization components of a single optical propagating mode.

To transmit the largest amount of information, it may be desirable to transmit data symbols of a constellation that maximizes the mutual information at a given signal-to-noise ratio (SNR). One source of noise is the additive white Gaussian noise (AWGN), e.g., noise typically produced by stimulated emission in optical amplifiers. Unfortunately, both identifying and using a constellation that maximizes the information communicated in the presence of AWGN can be challenging. For example, searching for a constellation that approximately maximize the minimum Euclidian distance between pairs of data symbols in the constellation may be simpler than searching for constellations that actually maximize the mutual information. But, defining a constellation that maximizes the minimum distance between data symbols can be complicated, and using such a constellation in an optical fiber communication system may result in complex modulation and/or demodulation of data onto and from an optical carrier. For that reason, the applicants searched for geometric methods to define constellations in manners that tend to produce a large minimum distance between the data symbols therein even though the minimum distance may not be maximized.

Herein, each data symbol of a constellation will be defined by a set of real coordinate pairs, wherein each coordinate pair to be located on or near one or more circle(s) about the origin in a relevant 2-dimensional Euclidian space, e.g., the space formed by the in-phase and quadrature phase electric field averaged over an optical modulation time slot. Each individual coordinate pair may be constrained to be located on a preselected set of one, two, three, four or more concentric circles about an origin of said 2-dimensional Euclidean space. In such a constellation, an individual coordinate pair may have values uniformly or non-uniformly distributed on such circle(s). For an individual coordinate pair, the number of available values may be the same or different on different ones of the circles. Also, in some embodiments, different coordinate pairs of the same data symbol may be jointly constrained, i.e., to limit the values of the different coordinate pairs in the set defining an individual data symbol of the constellation.

Herein, the data symbols of each constellation will be located on or near a sphere about the origin of a Euclidean space of dimension 4D, where D is an integer, e.g., D=1, 2, 3, 4, etc. For D=1, the constellation has its data symbols on or near a 3-dimensional sphere about the origin in a 4-dimensional real Euclidean space, and each data symbol occupies a single optical modulation time slot. For D=2, the constellation has its symbol points on or near a 7-dimensional sphere about the origin in an 8-dimensional real Euclidean space, and each data symbol occupies two consecutive, data modulation time slots. For D=3, the constellation has is symbol points on or near an 11-dimensional sphere about the origin in a 12-dimensional real Euclidean space, and each data symbol occupies three consecutive, optical modulation time slots.

Herein, an optical modulation time slot is a time period over which optical data modulator(s) of the optical fiber communication system transmit a single modulation form on an optical carrier. For example, the optical modulation time slots typically have temporal lengths given by an inverse of the baud rate for driving the optical data modulator(s). The temporal length of a data symbol on the optical carrier may be 1, 2, 3, 4 etc. times the length of the optical modulation time slot.

In various embodiments, some of the geometrically defined constellations of the present application may be advantageous for one or more reasons. First, some such geometrically defined constellations may provide a large minimum Euclidean distance between the data symbols therein even if the minimum distance is not maximized. For this reason, such constellations may still enable the communication of large amounts of information in the presence of AGWN. Second, such geometrically defined constellations may provide approximately the same transmitted total optical intensity, when averaged over an optical modulation time slot, e.g., an approximately constant total optical power. Such about constant total transmitted optical power is believed, by the inventors, to reduce undesired non-linear optical degradations of data-modulated optical carrier in the optical transmission fiber(s). Third, such geometrically defined embodiments may enable simpler implementations of electronic drivers of optical data modulators in optical data transmitters and/or enable simpler implementations of electronic, data-symbol, demodulator circuits in optical data receivers, e.g., due to simpler algorithms for identifying the coordinate pairs of data symbols.

FIG. 1 schematically illustrates an optical data transmitter 10. The optical data transmitter 10 includes a light source 12; a light splitter 14; a pair of optical data modulators 16, 18; an optical polarization combiner 20; and an electronic driver 22.

The light source 12 may be a laser, e.g., a continuous-wave output laser, which produces the light for the optical carrier. For example, the laser may be a narrow line-width laser, e.g., an external cavity laser.

The light splitter 14 is connected to receive light from the light source 12 and transmit part of the received light to each of the optical data modulators 16, 18, e.g., in about equal intensity parts. The light splitter 14 may be, e.g., a conventional optical intensity splitter, e.g., a 50/50 optical splitter, or may be a conventional polarization beam splitter appropriately aligned with respect to the polarization output of the light source 12, e.g., to produce two about equal intensity light beams.

The optical data modulators 16, 18 may be conventional optical modulators for phase modulating an optical carrier. Each of the optical data modulators 16, 18 is capable of separately modulating the in-phase (I) and quadrature-phase (Q) components of the optical carrier in response to electrical driving signals from the electronic driver 22. For example, each optical data modulator 16,18 may be a nested Mach-Zehnder interferometer (MZI), in which the data-modulated optical carriers produced by the two component MZIs of the nested MZI are combined with a relative phase of about $\pi/2$ radians to produce I and Q data-modulated parts of one polarization component of the final data-modulated optical carrier.

The optical polarization combiner 20 combines the two components of the data-modulated optical carriers received from the two optical data modulators 16, 18 with different polarizations, e.g., with relatively orthogonal polarizations at the near end face optical fiber transmission line 24. That is, the optical polarization combiner 20 combines the component data-modulated optical carrier from the two optical data modulator 16, 18 to produce a polarization-multiplexed, data-modulated optical carrier incident on near end face the optical fiber line 24. For example, optical polarization combiner 20 may perform said combining operation so that the light from each optical data modulator 16, 18 primarily excites a different one of two orthogonal polarization components of a single optical propagating mode of the optical fiber line 24, at the near end face thereof.

The electronic driver 22 is connected to receive an input digital data stream (DATA) and map segments thereof, e.g., consecutive segments, into corresponding data symbols and to output corresponding electrical signal sets to drive the pair of optical data modulators 16, 18 to modulate the optical carriers to carry the data symbols. In particular, the electronic driver 22 outputs a temporal sequence of D sets of electrical driver signals for the two optical data modulators 16, 18, via electrical connections (EC) for each of said data symbols, i.e., for D optical modulation time slots. Here, D is a positive integer, e.g., 1, 2, 3, 4, etc. Typically, each consecutive such set causes parallel I and Q modulation by each optical data modulator 16, 18 in a single optical modulation time slot.

The electronic driver 22 operates the optical data modulators 16, 18 in parallel, e.g., simultaneously, so that portions of each data symbol are modulated onto the two components of the optical carrier by the individual optical data modulators 16, 18. As a result, first and second separate portions of each data symbol are typically carried by the two relatively orthogonal polarization components of the optical propagating mode in the optical fiber line 24.

In some embodiments, the electronic driver 22 may operate the optical data modulators 16, 18 to modulate portions an individual data symbol onto the optical carrier over one or more optical modulation time slots. That is, the transmission of a single data symbol may require and a temporal sequence of sequential optical modulations on the final optical carrier.

The optical fiber line 24 supports two orthogonal polarization components of one or more optical propagating mode(s) therein. For example, the optical fiber line 24 may include one or more spans of conventional single mode optical fiber or of one or more spans of a multimode optical fiber, e.g., a few mode optical fiber. As already mentioned, the optical data transmitter 10 may transmit a stream of data symbols by using both orthogonal polarization components of the same lateral spatial propagating mode(s) of the optical fiber line 24. For example, such a pair of orthogonally polarization components of one type of optical propagating mode in a multimode or multicore optical fiber line.

In the embodiment of FIG. 1, internal connecting optical paths are schematically indicated by an optical waveguide (OW). But, some or all of said internal connecting optical paths may also be free space optical paths in other embodiments.

Figure 2:
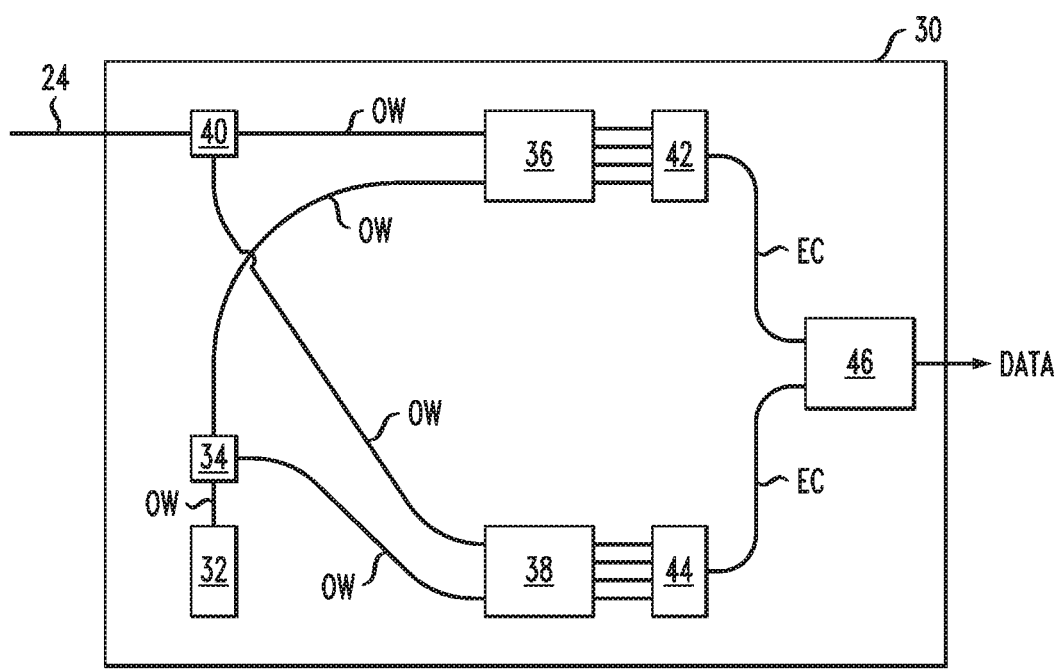
FIG. 2 is a block diagram schematically illustrating an embodiment of an optical data receiver.

FIG. 2 schematically illustrates an example of an optical data receiver 30, i.e., a coherent optical data receiver. The optical data receiver 30 includes a local optical source 32; a light splitter 34; optical hybrids 36, 38; a polarization splitter 40; analog electronic detection and processing circuits 42, 44; and a digital signal processor 46.

The local optical source 32 may be, e.g., a continuous-wave laser with about the same wavelength as received data-modulated optical carrier. The local optical source 32 may be a narrow line width laser, e.g., an external cavity laser.

The light splitter 34 receives light from the local optical source 32 and transmits a portion of said light to each of the optical hybrids 36, 38, e.g., about equal intensity portions thereof. The light splitter 14 may be, e.g., a conventional optical intensity splitter, e.g., a 50/50 optical splitter, or a conventional polarization beam splitter appropriately aligned with respect to the polarization of the light beam from the local optical source 32.

Each optical hybrid 36, 38 is an optical mixer that interferes, at optical outputs thereof, combinations of light received at their two optical inputs. For example, each optical hybrid 36, 38 may be a conventional 90 degree optical hybrid, for which a difference in optical intensities on one pair of the optical outputs may be a measure of primarily an I-component of the received data-modulated optical carrier, and the difference in the optical intensities on the other pair of optical outputs may be a measure of primarily a Q-component of said same data-modulated optical carrier. The optical hybrids 36, 38 may have any conventional construction, e.g., planar waveguide optical mixers or multimode optical interference devices, and a person of ordinary skill would understand how to make suitable ones of such optical hybrids in light of the present disclosure.

The polarization splitter 40 splits the data-modulated optical carrier, which is received from the optical fiber line 24, into two, about orthogonal, polarization components and transmits each of the polarization components to a corresponding one of the optical hybrids 36, 38. Thus, each optical hybrid 36, 38 is connected for optical coherent detection of the I-phase and Q-phase modulation of one of the polarization components of a received data-modulated optical carrier.

Each analog electronic detection and processing circuit 42, 44 detects the optical signals at the optical outputs of a corresponding one of the optical hybrids 36, 38. Each analog electronic detection and processing circuit 42, 44 may include one or more balanced arrays of photodiodes for detecting differences in light intensities at pairs of optical outputs of the corresponding optical hybrid 36, 38, low-pass electronic filter(s) for processing electrical signals output by one or more the balanced arrays, electronic amplifiers for amplifying said processed electrical signals, and analog-to-digital converters to convert said amplified electrical signals into digital representations thereof. Each analog electronic detection and processing circuit 42, 44 outputs two digital electrical signals indicative of the data-modulations of the two phases, e.g., the I and Q phases, of one polarization component of the data-modulated optical carrier received from the optical fiber line 24.

The digital signal processor 46 is connected to receive, from the analog electronic detection and processing circuits 42, 44 via electrical connections (EC), a digital signal stream indicative of data modulations on I and Q phases of the two orthogonal polarization components of the data-modulated optical carrier received from the optical fiber line 24. Typically, the digital signal processor 46 includes circuitry for correcting for various types of optical impairments ins the received data-modulated optical carrier, e.g., cumulated chromatic dispersion, phase and frequency offset, I-Q misalignment, and polarization mode dispersion and polarization rotation.

The digital signal processor (DSP) 46 is configured to demodulate data symbols of a constellation whose data symbols are defined by modulations of the I and Q phases of the optical carrier in both orthogonal polarization components thereof. The modulations defining one data symbol extend over a sequence of D consecutive optical carrier modulation periods, wherein D is a positive integer, e.g., 1, 2, 3, 4, etc. That is, the DSP 46 is configured to identify parallel modulations of the transmitted data-modulated optical carrier over a consecutive sequence of one or more optical modulation time slots, in order to demodulate individual data symbols. The DSP 46 outputs a digital data stream (DATA) indicative of the data carried by the stream of data symbols modulated on the data-modulated optical carrier received from the optical fiber line 24.

In the embodiment of FIG. 2, individual internal connecting optical paths are indicated by optical waveguides (OW), but, some or all of said internal connecting optical paths may also be formed as free space optical paths in other embodiments.

In the embodiment of FIG. 2, electrical connections EC connect the analog electronic detection and processing circuits 42, 44 to the DSP 46.

Figure 3:
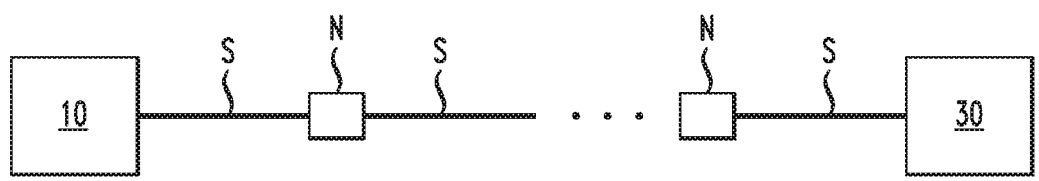
FIG. 3 is a block diagram schematically illustrating an example of an optical fiber communication system, e.g., using the optical data transmitter and receiver of FIGS. 1-2.

FIG. 3 schematically illustrates an example of an all-optical fiber communication system 50. The optical fiber communication system 50 includes the optical data transmitter 10 of FIG. 1, the optical data receiver 30 of FIG. 2, and the optical fiber line 24 of FIGS. 1-2. Here, the optical fiber line 24 may have a sequence of one or more optical fiber spans S, which are optically end-coupled by intermediate nodes (N). One or more intermediate nodes (N) may provide conventional optical amplification, e.g., by providing conventional forward and/or backward Raman pumping and/or conventional lumped erbium doped fiber, optical amplifier(s), and/or may provide conventional optical dispersion management. Often, such intermediate optical processing of the transmitted data-modulated optical carrier will introduce AGWN onto the data-modulated optical carrier being communicated from the optical data transmitter 10 to the optical data receiver 30. The communication over the optical fiber line 24 may also introduce nonlinear optical degradation into said data-modulated optical carrier.

Constellations

Various constellations will be described with respect to embodiments for which the optical fiber line 24 has one or more spans of single mode optical fiber. From the present description, the person of ordinary skill in the relevant arts would understand how to implement the inventions in embodiments where the optical fiber line 24 is formed by spans of multimode fiber, e.g., multicore or few mode optical fiber. For example, the constellations could also be implemented with two orthogonal polarization components of an optical propagating mode in embodiments in which the optical fiber line 24 includes spans of multimode optical fiber.

Below, constellations of various embodiments will be described with respect to the optical data transmitter 10, the optical data receiver 30, and the optical communication system 50 of FIGS. 1-3. In particular, the electronic driver 22 and the DSP 46 of FIGS. 1-2 will have circuitry for enabling optical data communication via these special constellations of data symbols. The constellations are embedded in four or more Euclidean dimensions, e.g., 4D dimensions with D a positive integer, e.g., 1, 2, 3, 4, etc. The data symbols of each such constellation lie on or near a corresponding (4D-1)-dimensional sphere, i.e., $S^{4D-1}$. The sphere is embedded in a 4D real Euclidean space and is centered on the origin of the Euclidean space.

In addition, the electronic driver 22 typically maintains the total energy of the transmitted data-modulated optical carrier to be approximately constant. For example, the average value of the total light intensity over an optical modulation time slot may be approximately constant when said average value is compared for different optical modulation time slots. Due to the approximate constant total light intensity, the inventors believe that undesired effects of nonlinear optical interactions should be reduced. In some embodiments, the total energy of the transmitted, data-modulated optical carrier may be approximately constant over consecutive optical modulation time slots even in embodiments for which a single data symbol occupies a plurality of consecutive optical modulation time slots.

For each such constellation, the available values of data symbols are on and/or near a corresponding sphere, i.e., $S^{4D-1}$, and are preferably spread over and/or near the sphere in a manner that provides a large minimum distance between the data symbols. In addition, the data symbols are defined in a manner that may provide simplified algorithms for electrically driving the optical data modulators 16, 18, with the electronic driver 22, and/or for identifying individual ones of the data symbols during data demodulation in the DSP 46.

An axially symmetric single-mode fiber (SMF) usually has two optical propagating modes of orthogonal polarization. For the two orthogonal modes, electric field vectors will be referred to as $E_X(x, t)$ and $E_Y(x, t)$, respectively, where x is the spatial position and t is the time. For the two modes, the respective electrical field vectors $E_X(x, t)$ and $E_Y(x, t)$ are locally orthogonal at all points x. Thus, the total light intensity is typically given by $|E_X(x, t)|^2 + |E_Y(x, t)|^2$, i.e., integrated over the optical fiber's cross section. Since nonlinear optical interactions are about proportional to the total light intensity, e.g., about proportional to $|E_X(x, t)|^2 + |E_Y(x, t)|^2$. The inventors believe that undesired nonlinear optical effects may be reduced by keeping the total light intensity constant when averaged over the small number, D, of consecutive optical modulation time slots used to transmit an individual data symbol. That is, the inventors believe that using a geometrically defined constellation defined by:

$$\Sigma_{t=1,\ldots,D}\int_{csf}\{|E_X(x,t)|^2+|E_Y(x,t)|^2\}=$$
$$\Sigma_{t=1,\ldots,D}\{E_{X,I}(t)^2+E_{X,Q}(t)^2+E_{Y,I}(t)^2+E_{Y,Q}(t)^2\}=R^2, \quad (1)$$

may result in less undesired nonlinear optical distortions of the data-modulated optical carrier in the optical transmission fiber(s). In Eq. (1), R is a constant, $E_{X,I}(t)^2$, $E_{X,Q}(t)^2$, $E_{Y,I}(t)^2$, and $E_{Y,Q}(t)^2$ are the averages of squares of the electrical fields of the I-phase and Q-phase components of the X and Y orthogonal polarization components of the modulated optical carrier integrated over the cross section of the optical fiber (csf), and "t" is time of the optical modulation time slot. Eq. (1) states that the total light intensity, summed over the optical modulation time slots of the data symbol is constant. The total intensity is a sum of intensities of the orthogonal I-phase and Q-phase parts of the data-modulated optical carrier summed over the two X and Y orthogonal polarization components. Eq. (1) implies that the data symbols of the constellation lie on a (4D-1)-dimensional sphere about the origin in 4D-dimensional real Euclidean space where the real Euclidean coordinates of a data symbol are:

$$\{E_{X,I}(t_1),E_{X,Q}(t_1),E_{Y,I}(t_1),\ldots,E_{X,I}(t_D),E_{X,Q}(t_D),E_{Y,I}(t_D),E_{Y,Q}(t_D)\}. \quad (2)$$

Below, constructions are given to define the data symbols for different constellations. In some embodiments, the constructions involve imposing constraints on coordinate pairs of the individual data symbols to be on one, two, or more circles about the origin in the 2-dimensional real Euclidean spaces of the coordinate pairs. Such constructions produce sets of data symbols that can be easily defined for modulation and/or easily identified during demodulation, e.g., because the individual coordinate pairs of a data symbol are located on or near a preselected set of one or more concentric circles.

Data Symbol in a Single Modulation Period

In this section, each data symbol of the constellation is transmitted in a separate single optical modulation time slot, i.e., D=1. For such a constellation, the optical data modulators 16, 18 of FIG. 1 produce data symbols whose I-phase and Q-phase electric fields satisfy:

$$E_{X,I}(t)^2+E_{X,Q}(t)^2+E_{Y,I}(t)^2+Y_{Q}(t)^2=R^2. \quad (1\_1)$$

Eq. 1_1 states that the data symbol of an optical modulation time slot "t", is a point on a 3-dimensional sphere of radius R in the real Euclidean space formed by values of the real and imaginary parts of the X and Y electric fields, i.e., the Euclidean space whose points are: $\{E_{X,I}(t), E_{X,Q}(t), E_{Y,I}(t), E_{Y,Q}(t)\}$. Equation (1_1) is one constraint on the 4 real coordinates $E_{X,I}(t)$, $E_{X,Q}(t)$, $E_{Y,I}(t)$, and $E_{Y,Q}(t)$ of each transmitted data symbol.

Below, reference to the modulation period "t" will be dropped to simplify notations for such embodiments where a data symbol spans a single optical modulation time slot. That is, $E_{X,I}(t) \to E_{X,I}$, $E_{X,Q}(t) \to E_{X,Q}$, $E_{Y,I} \to E_{Y,I} \to E_{Y,Q}(t) - E_{Y,Q}$ for writing simplicity below.

For such a constellation, each data symbol may be subject to further constraints on their defining I-Q-coordinate pairs $(E_{X,I}, E_{X,Q})$ and $(E_{X,I}, E_{X,Q})$. The constraints may have the form:

$$E_{X,I}^2 + E_{X,Q}^2 = R_X^2 \text{ and } E_{Y,I}^2 + E_{Y,Q}^2 = R_Y^2 \text{ where } R_X^2 + R_Y^2 = R^2. \quad (1\_2)$$

That is, eq. (1_1) is solved for the X polarization component, I-Q-coordinate pair $(E_{X,I}, E_{X,Q})$ being on a first circle of radius $R_X$ and for the Y-polarization component, I-Q coordinate pair $(E_{Y,I}, E_{Y,Q})$ being on a second circle of radius $R_Y$ where both circles have centers at (0, 0) in the relevant 2-dimensional Euclidean space. The radii of the two circles satisfy $R_X^2 + R_Y^2 = R^2$.

In some such constellations, each I-Q-coordinate pair may be constrained to lie on 1, 2, 3, or more such concentric circles. That is, $R_X$ may be $R_X(j)$ with $j=1, 2, 3, \ldots$ so that $R_Y$ will be $R_Y(j)$ with $\{R_X(j)\}^2 \{R_Y(j)\}^2 = R^2$ according to Eq. (1_2). The relationship $R_X^2 + R_Y^2 = R^2$ is a constraint between the coordinate pair $(E_{X,I}, E_{X,Q})$ and the coordinate pair $(E_{Y,I}, E_{Y,Q})$ of the data symbols of the constellation. To summarize such multiple concentric circle definitions of constellations satisfy the equations:

$$\{E_{X,I}(j)\}^2 + \{E_{X,Q}(j)\}^2 = \{R_X(j)\}^2, \{E_{Y,I}(j)\}^2 + \{E_{Y,Q}(j)\}^2 = \{R_Y(j)\}^2, \text{ and}$$

$$\{R_X(j)\}^2 + \{R_Y(j)\}^2 = R^2 \text{ with } j=1, \ldots, N. \quad (1\_3)$$

The above constraints ensure that such a multiple concentric circle construction produces a constellation whose various data symbols satisfy equation (1_1). $R_X(j)$ or $R_Y(j)$ may be 0.

Figure 4:
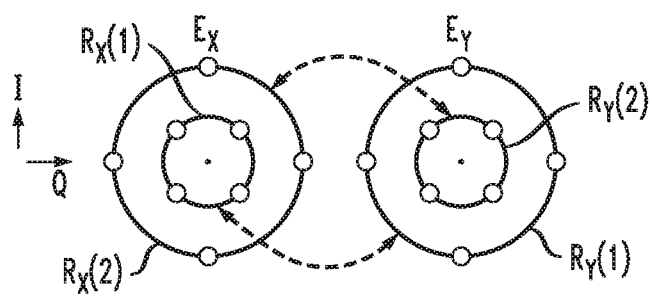
FIG. 4 schematically illustrates first definition of a constellation of data symbols, e.g., values of data symbols used in individual modulation time slots by the optical data transmitter and receiver of FIGS. 1-3.

FIG. 4 schematically illustrates an embodiment of a two concentric circle construction of a constellation, i.e., according to eq. (1_3) for N=2 and j ε{1, 2}. In this construction, each X-polarization, I-Q-coordinate pair $(E_{X,I}, E_{X,Q})$ lies on an $E_X$ circle of radius $R_X(1)$ or $R_X(2)$, and each Y-polarization I-Q-coordinate pair $(E_{Y,I}, E_{Y,Q})$ lies on a $E_Y$ circle of radius $R_Y(1)$ or $R_Y(2)$. Coordinate pairs are empty small circles in FIG. 4. To ensure that eq. (1_2) is satisfied, the pair $(E_{X,I}, E_{X,Q})$ lies on the inner $E_X$ circle when the pair $(E_{Y,I}, E_{Y,Q})$ lies on the outer $E_Y$ circle, and the pair $(E_{X,I}, E_{X,Q})$ lies on the outer $E_X$ circle when the pair $(E_{Y,I}, E_{Y,Q})$ lies on the inner $E_Y$ circle. This constraint is schematically illustrated by 2 dashed double arrowed lines between the two circles for the coordinate pair $(E_{X,I}, E_{X,Q})$ and the two circles for the coordinate pair $(E_{Y,I}, E_{Y,Q})$, i.e., to indicate circle-to-circle constraints. The constellation has one data symbol for each pairing of a point of the inner $E_X$ circle with a point of the outer $E_Y$ circle, and also has one data symbol for each pairing of a point of the outer $E_X$ circle with a point of the inner $E_Y$ circle. For the illustrated example with 4 points on each $E_X$ circle and each $E_Y$ circle, such a circle relationship leads to a constellation of 4×4+4×4 values for the data symbols, i.e., 32 different data symbols. In other embodiments, the numbers of points on the each of the $E_X$ and $E_Y$ circles may be different and/or the distributions of said points may be different on the various $E_X$ and $E_Y$ circles, e.g., being uniformly or non-uniformly distributed on the various $E_X$ and $E_Y$ circles.

Since the coordinate pairs $(E_{X,I}, E_{X,Q})$ and $(E_{Y,I}, E_{Y,Q})$ lie on or near, at most, a few concentric circles in such constellations, the electronic driver 22 of FIG. 1 and/or the DSP 46 of FIG. 2 may be less complex. The simple geometrical definitions of the locations of such coordinate pairs of the data symbols may enable less complex algorithms for determining driver values for producing the transmitted data symbols, i.e., during modulation, and/or less complex algorithms for identifying received data symbols, i.e., during demodulation, than in alternate coherent optical communication systems in which data symbols are uniformly distributed over a 3-dimensional sphere. Due to the form of the present constellations, the DSP 46 may be simpler and possibly more rapid than a DSP in a coherent optical data receiver for a constellation whose data symbols are more uniformly spatially distributed on a 3-dimensional sphere. Thus, while the present embodiments may not provide the most advantageous constellations with respect to error protection, some such embodiments may enable higher baud rates in the DSP 46 of the coherent optical data receiver 30.

Figure 5:
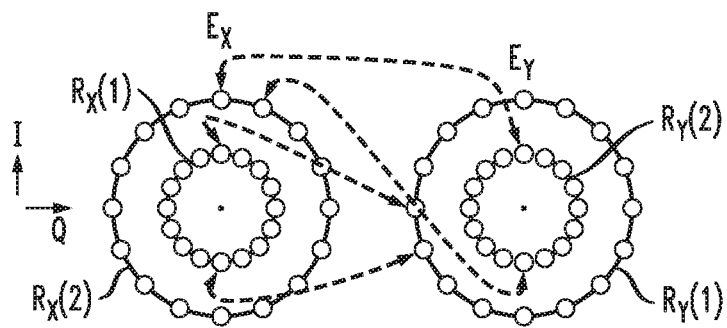
FIG. 5 schematically illustrates second definition of a constellation of data symbols, e.g., values of data symbols used in individual modulation time slots by the optical data transmitter and receiver of FIGS. 1-3.
Figure 6:
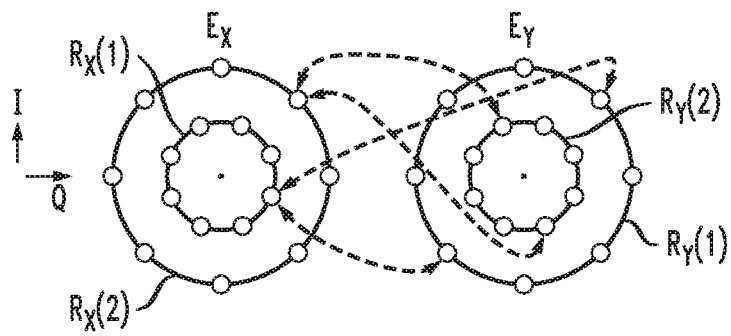
FIG. 6 schematically illustrates third definition of a constellation of data symbols, e.g., values of data symbols used in individual modulation time slots by the optical data transmitter and receiver of FIGS. 1-3.
Figure 7:
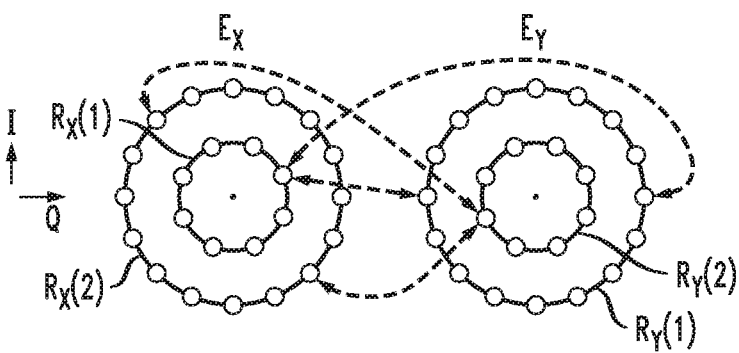
FIG. 7 schematically illustrates fourth definition of a constellation of data symbols, e.g., values of data symbols used in individual modulation time slots by the optical data transmitter and receiver of FIGS. 1-3.

FIGS. 5, 6, and 7 schematically illustrate constructions of other constellations in which the data symbols satisfy eq. (1_3) for N=2. The constellations impose other constraints between the X-polarization, I-Q-coordinate pairs $(E_{X,I}, E_{X,Q})$ and the Y-polarization, I-Q-coordinate pairs $(E_{Y,I}, E_{Y,Q})$ of data symbols. Dashed double arrowed lines indicate illustrative coordinate pairs $(E_{X,I}, E_{X,Q})$ and $(E_{Y,I}, E_{Y,Q})$ satisfying the constraints. Such pairs are empty small circles in FIGS. 5-7. The other constraints associate points of the $E_X$ circles to points of the $E_Y$ circles without associating all points of any pair of $E_X$ and $E_Y$ circles in a data symbol. Each illustrated construction has 32 data symbols. Other embodiments evident to the person of ordinary skill in light of the present disclosure, can have different numbers of data symbols. As will be clear, for the same number of data symbols, the further constraints may increase the minimum distance between the data symbols of such constellations and/or may improve the uniformity of the distribution of data symbols of the constellation on a 3-dimensional sphere.

FIG. 5 schematically illustrates a two concentric circle construction of a constellation in which each X-polarization I-Q-coordinate pair $(E_{X,I}, E_{X,Q})$ lies on an inner or outer circle and each Y-polarization I-Q-coordinate pair $(E_{Y,I}, E_{Y,Q})$ lies on an inner or outer circle. As above, the coordinate pair $(E_{X,I}, E_{X,Q})$ lies on the inner $E_X$ circle when the coordinate pair $(E_{Y,I}, E_{Y,Q})$ lies on the outer $E_Y$ circle, and the coordinate pair $(E_{X,I}, E_{X,Q})$ lies on the outer $E_X$ circle when the coordinate pair $(E_{Y,I}, E_{Y,Q})$ lies on the inner $E_Y$ circle. Also, the data symbols are defined such that each value of X-polarization, I-Q-coordinate pair $(E_{X,I}, E_{X,Q})$ is associated with a single value of the Y-polarization, I-Q-coordinate pair $(E_{Y,I}, E_{Y,Q})$. In the illustrated embodiments, the data symbols are defined such that neighboring points on the outer $E_X$ circle are associated to about diametrically opposite points on the inner $E_Y$ circle and such that neighboring points on the outer $E_Y$ circle are associated to about diametrically opposite points on the inner $E_X$ circle. In this constellation, the minimum distance can be large, because a small distance between one I-Q-coordinate pair of two data symbols can imply a large distance between the other I-Q-coordinate pair of said two data symbols.

FIG. 6 schematically illustrates yet another two concentric circle construction of a constellation whose data symbols have X-polarization, I-Q-coordinate pair $(E_{X,I}, E_{X,Q})$ on an inner or outer $E_X$ circle and Y-polarization, I-Q-coordinate pair $(E_{Y,I}, E_{Y,Q})$ on an inner or outer $E_Y$ circle. Again, for each data symbol, the coordinate pair $(E_{X,I}, E_{X,Q})$ lies on the inner $E_X$ circle when the coordinate pair $(E_{Y,I}, E_{Y,Q})$ lies on the outer $E_Y$ circle, and the coordinate pair $(E_{X,I}, E_{X,Q})$ lies on the outer $E_X$ circle when the coordinate pair $(E_{Y,I},$ $E_{Y,Q}$) lies on the inner $E_Y$ circle. Also, 2 data symbols are defined for each value of an X-polarization, I-Q-coordinate pair on an inner or outer $E_X$ circle, because the Y-polarization, I-Q-coordinate pairs can have two diametrically opposite values on the respective outer or inner $E_Y$ circle. If the point of the pair ($E_{X,I}$, $E_{X,Q}$) is on the inner $E_X$ circle, there are only two data symbols for which the pair ($E_{Y,I}$, $E_{Y,Q}$) has values at or near diametrically opposite points on the outer $E_Y$ circle. Similarly, if the point of the pair ($E_{X,I}$, $E_{X,Q}$) is on the outer $E_X$ circle, there are only two data symbols for which the pair ($E_{Y,I}$, $E_{Y,Q}$), has values at or near diametrically opposite points on the inner $E_Y$ circle.

FIG. 7 schematically illustrates yet another two concentric circle construction of a constellation whose data symbols have X-polarization, I-Q-coordinate pairs ($E_{X,I}$, $E_{X,Q}$) on an inner or outer $E_X$ circle and Y-polarization, I-Q-coordinate pairs ($E_{Y,I}$, $E_{Y,Q}$) on an inner or outer $E_Y$ circle. Again, for each data symbol, the coordinate pair ($E_{X,I}$, $E_{X,Q}$) lies on the inner $E_X$ circle when the coordinate pair ($E_{Y,I}$, $E_{Y,Q}$) lies on the outer $E_Y$ circle, and the coordinate pair ($E_{X,I}$, $E_{X,Q}$) lies on the outer $E_X$ circle when the coordinate pair ($E_{Y,I}$, $E_{Y,Q}$) lies on the inner $E_Y$ circle. Also, 2 data symbols are defined for each value of an I-Q-coordinate pair on an inner $E_X$ or $E_Y$ circle, which are associated with two diametrically opposite values on the respective outer $E_Y$ or $E_X$ circle. That is, if a coordinate pair is on the inner circle, there are data symbols for which the other coordinate pair has 2 values at or near diametrically opposite points on the other outer circle. In this embodiment, there are twice as many points on the outer $E_X$ and $E_Y$ circles as on the inner $E_X$ and $E_Y$ circles.

From the above examples, the person of ordinary skill in the relevant arts would be able to readily construct other constellations in which the data symbols are located on or near a 3-dimensional sphere and X-polarization, I-Q-coordinate pairs and/or Y-polarization, I-Q-coordinate pairs for the data symbols are located on one or more associated concentric circles.

Data Symbol in Multiple Modulation Periods

In some embodiments of the optical data transmitter 10 of FIG. 1, the optical data receiver 30 of FIG. 2, and/or the optical fiber communication system 50 of FIG. 3, each data symbol of a constellation extends over a sequence of D consecutive optical modulation time slots as in above eq. (2), i.e., for D>1. In such constellations, the data symbols satisfy eq. (1) so that the total light intensity is about constant, when averaged over the D optical modulation time slots of individual data symbols. In such embodiments, the data symbols are located on or near points of a (4D-1)-dimensional spheres in a 4D-dimensional real Euclidean space as already discussed.

The inventors believe that advantageous specific embodiments of such constellations may be further constrained such that the data symbols are on or near points of a space that is a direct product of D 3-dimensional spheres. In such a constellation, the data symbols satisfy:

$$E_{X,I}(t_r)^2 + E_{X,Q}(t_r)^2 + E_{Y,I}(t_r)^2 + E_{Y,Q}(t_r)^2 = R^2 \text{ for } r=1,\ldots,D. \quad (1\_1\_1)$$

Here, the sequence of D consecutive optical modulation time slots $\{t_1, \ldots, t_D\}$ is the set of optical modulation time slots of a single data symbol. Eq. (1_1_1) implies that the total light intensity is constant over individual optical modulation time slots "$t_r$" even though an individual data symbol spans a plurality of such optical modulation time slots. The inventors believe that some such special constellations may reduce undesired nonlinear optical degradations of the data symbols during transmission through the optical fiber line 24 while enabling a larger minimum distance between said data symbols, e.g., larger than for some constellations of FIGS. 4-7.

For example, in some constellations according to Eq. (1_1_1), each part of a same data symbol, in the D different optical modulation time slots, may be in one of the 4-dimensional constellations of FIGS. 4-7, but the 4-dimensional constellation of FIGS. 4-7 may be different for the parts of the same data symbol in the D different optical modulation time slots. As an example, for D=2, the part of some data symbols in the first optical modulation time slot may belong to the constellation of FIG. 4, and the part of the same some data symbols in the second optical modulation time slot may belong to a constellation of FIG. 5, 6, or 7.

In some examples of constellations according to Eq. (1_1_1), constraints may be imposed between parts of an individual data symbol in different optical modulation time slots "$t_r$" of the same data symbol. As an example for D=2, the two parts of a single data symbol in consecutive optical modulation time slots may both belong to one of the 4-dimensional constellations of FIGS. 4-7. Said two parts of the same data symbol for part or all of the constellation may be subject to constraint(s) that further restrict the allowed values of $\{E_{X,I}(t_1), E_{X,Q}(t_1)\}$ according to the values of $\{E_{Y,I}(t_2), E_{Y,Q}(t_2)\}$ or may alternately further restrict the allowed values of $\{E_{X,I}(t_1), E_{X,Q}(t_1)\}$ according to the values of $\{E_{X,I}(t_2), E_{X,Q}(t_2)\}$. As an example, the coordinate pairs $\{E_{X,I}(t_1), E_{X,Q}(t_1)\}$ and $\{E_{Y,I}(t_2), E_{Y,Q}(t_2)\}$ may be mutually constrained as already described with respect to any of above FIG. 4, 5, 6, or 7 except that the coordinate pairs on the $E_X$ circles and the $E_Y$ circles are in different optical modulation time slots of the same data symbol. Alternatively, the coordinate pairs $\{E_{X,I}(t_1), E_{X,Q}(t_1)\}$ and $\{E_{X,I}(t_2), E_{X,Q}(t_2)\}$ of the $t_1$ and $t_2$ optical modulation time slots may be mutually constrained as described with respect to any of FIG. 4, 5, 6, or 7 except that coordinate pairs on the $E_X$ circles in FIGS. 4-7 are now on $E_X(t_1)$ circles and coordinate pairs on the $E_Y$ circles in FIGS. 4-7 are now on $Ex(t_2)$ circles. Said two parts of the same data symbol may also be subject to constraint(s) that further relate the allowed values of $\{E_{Y,I}(t_1), E_{Y,Q}(t_1)\}$ to the values of $\{E_{X,I}(t_2), E_{X,Q}(t_2)\}$ or further relate the allowed values of $\{E_{Y,I}(t_1), E_{Y,Q}(t_1)\}$ to the values of $\{E_{X,I}(t_2), E_{X,Q}(t_2)\}$ in analogous manners. As an example, the coordinate pairs $\{E_{Y,I}(t_1), E_{Y,Q}(t_1)\}$ and $\{E_{X,I}(t_2), E_{X,Q}(t_2)\}$ may be mutually constrained as already described with respect to any of above FIG. 4, 5, 6, or 7 except that the coordinate pairs on the $E_Y$ circles and the $E_X$ circles are in different optical modulation time slots of the same data symbol. Alternatively, the coordinate pairs $\{E_{Y,I}(t_1), E_{Y,Q}(t_1)\}$ and $\{E_{Y,I}(t_2), E_{Y,Q}(t_2)\}$ of the $t_1$ and $t_2$ optical modulation time slots may be mutually constrained as described with respect to any of FIG. 4, 5, 6, or 7 except that the coordinate pairs on the $E_X$ circles in FIGS. 4-7 are on now on $E_X(t_1)$ circles and the coordinate pairs on $E_Y$ circles in FIGS. 4-7 are now on $E_Y(t_2)$ circles.

In some embodiments of the above paragraph, it may be advantageous that coordinate pairs of each polarization component to remain on circles of similar size in all optical modulation time slots "$t_r$". For example, the coordinate pairs $\{E_{X,I}(t_r), E_{X,Q}(t_r)\}$ may be restricted to be on the inner circles of FIG. 4, 5, 6, or 7 in all optical modulation time slots "$t_r$" or alternately may be restricted to be on the outer circles of FIG. 4, 5, 6, or 7 in all optical modulation time slots "$t_r$". Similarly, the coordinate pairs $\{E_{Y,I}(t_r), E_{Y,Q}(t_r)\}$ may be restricted to be on the outer circles of FIG. 4, 5, 6, or 7 in all optical modulation time slots "$t_r$" or alternately may be restricted to be on the inner circles of FIG. 4, 5, 6, or 7 in all optical modulation time slots "$t_r$". Such constraints may reduce undesired degradations of data symbols due to nonlinear optical effects.

In other embodiments of constellations satisfying eq. (1_1_1), the 4 real coordinates {$E_{X,I}(t_r)$, $E_{X,Q}(t_r)$, $E_{Y,I}(t_r)$, $E_{Y,Q}(t_r)$} of data symbols, for each optical modulation time slot "$t_r$", may be more generally located. In such constellations, e.g., for D=2, 3, 4 or more, it may not be required that the X-polarization, I-Q-coordinate pair of each data symbol be on or near a preselected set of concentric circles and/or that the Y-polarization, I-Q-coordinate pair of each data symbol be on or near another preselected set of concentric circles. For example, the set of 4 real coordinates for X-polarization and Y-polarization parts of each data symbol, i.e., the sets {$E_{X,I}(t_r)$, $E_{X,Q}(t_r)$, $E_{Y,I}(t_r)$, $E_{Y,Q}(t_r)$} may be constrained to lie on a 3-dimensional sphere of the same radius "R", for one or more optical modulation time slots $t_r$ of a data symbol, rather than being constrained to lie on products of sets of concentric circles as already described. With, at least, some of the data symbols of such a constellation not having X-polarization, I-Q-coordinate pairs and Y-polarization, I-Q-coordinate pairs located on or near such small sets of concentric circles, e.g., 2, 3, or 4 such circles per polarization component, such constellations may still be useful in some embodiments of the optical data transmitter 10 of FIG. 1, the optical data receiver 30 of Figure, and/or the fiber optical communication system 50 of FIG. 3. For such embodiments, the transmitted data-modulated optical carrier will still satisfy the requirement of having an about constant total light intensity or energy in each optical modulation time slot. But, such embodiments, for larger values of D, may enable a somewhat larger minimum distance between data symbols of the constellations for the same total number of data symbols, which can aid to increase the amount of information transmitted in the presence of AGWN. Of course, such constellations may require more complex modulation algorithms for the electronic driver 22 of FIG. 1 and/or more complex demodulation algorithms for the DSP 46 of FIG. 2.

The person of ordinary skill would be able to easily make and use coherent optical fiber transmission systems with other constellations according to eq. (1_1_1) based on the teachings of present application.

The Detailed Description of the Illustrative Embodiments and drawings merely illustrate principles of the inventions. Based on the present specification, those of ordinary skill in the relevant art will be able to devise various arrangements that, although not explicitly described or shown herein, embody the inventions and are included within the scope of the claims. Also, statements herein reciting principles, aspects, and embodiments are intended to encompass equivalents thereof.

What is claimed is:

1. An apparatus, comprising:
    a coherent optical data receiver including two optical hybrids, two light detectors and a digital signal processor, each optical hybrid being configured to output mixtures of a corresponding one of the polarization components of a received data-modulated optical carrier with reference light, each light detector to output digital measurements of the mixtures at a sequence of times from a corresponding one of the optical hybrids;
    wherein the digital signal processor is configured to identify a sequence of data symbols of a constellation having parts transmitted on both polarization components of the data-modulated optical carrier in response to receipt of the digital measurements, the transmitted data-modulated optical carrier having about a same total light intensity in each optical modulation time slot thereof, each data symbol being defined by in-phase and quadrature-phase electric field coordinates of both polarization components; and
    wherein pairs of the in-phase and quadrature-phase electric field coordinates of each of the polarization components of the data symbols for each optical modulation time slot are located on a preselected set of two or more concentric circles about an origin, the constellation having four times an integer dimensions; and
    wherein each pair of the data symbols having adjacent pairs of the in-phase and quadrature-phase electric field coordinates of one of the polarization components on one of the circles has pairs of the in-phase and quadrature-phase electric field coordinates of the other of the polarization components at or near diametrically opposite points on one of the circles.

2. The apparatus of claim 1, wherein for the pairs of in-phase and quadrature-phase electric field coordinates of the polarization components the preselected set includes at least three of the concentric circles.

3. The apparatus of claim 1, wherein for the pairs of in-phase and quadrature-phase electric field coordinates of the polarization components the preselected set includes at least four of the concentric circles.

4. The apparatus of claim 1, wherein each data symbol has parts on two or more consecutive ones of the optical modulation time slots.

5. The apparatus of claim 4, wherein for the pairs of in-phase and quadrature-phase electric field coordinates of each of the polarization components the preselected set includes at least three of the concentric circles.

6. The apparatus of claim 4, wherein for the pairs of in-phase and quadrature-phase electric field coordinates of each of the polarization components the preselected set includes at least four of the concentric circles.

7. The apparatus of claim 1, wherein the pairs of in-phase and quadrature-phase electric field coordinates of the different polarization components of individual ones of the data symbols are on circles with different size diameters.

8. The apparatus of claim 1, further comprising a coherent optical data transmitter having two in-phase and quadrature-phase optical data modulators and an electronic driver configured to electrically drive said optical data modulators to generate the transmitted data symbols of the constellation.

9. An apparatus, comprising:
    a coherent optical data receiver including two optical hybrids, two light detectors and a digital signal processor, each optical hybrid being configured to output mixtures of a corresponding one of the polarization components of a received data-modulated optical carrier with reference light, each light detector to output digital measurements of the mixtures at a sequence of times from a corresponding one of the optical hybrids;
    wherein the digital signal processor is configured to identify a sequence of data symbols of a constellation having parts transmitted on both polarization components of the data-modulated optical carrier in response to receipt of the digital measurements, the transmitted data-modulated optical carrier having about a same total light intensity in each optical modulation time slot thereof, each data symbol being defined by in-phase and quadrature-phase electric field coordinates of both polarization components; and wherein pairs of the in-phase and quadrature-phase electric field coordinates of each of the polarization components of the data symbols for each optical modulation time slot are located on a preselected set of two or more concentric circles about an origin, the constellation having four times an integer dimensions; and wherein each pair of the data symbols of the constellation having pairs of the in-phase and quadrature-phase electric field coordinates of one of the polarization components at a same point on one of the circles has pairs of the in-phase and quadrature-phase electric field coordinates of the other of the polarization components at or near diametrically opposite points on one of the circles.

10. The apparatus of claim 9, wherein for the pairs of in-phase and quadrature-phase electric field coordinates of the polarization components the preselected set includes at least three of the concentric circles.

11. The apparatus of claim 9, wherein each data symbol has parts on two or more consecutive ones of the optical modulation time slots.

12. The apparatus of claim 11, wherein for the pairs of in-phase and quadrature-phase electric field coordinates of the polarization components the preselected set includes at least three of the concentric circles.

13. The apparatus of claim 9, wherein the pairs of in-phase and quadrature-phase electric field coordinates of the different polarization components of individual ones of the data symbols are on circles with different size diameters.

14. A coherent optical data transmitter comprising:
two in-phase and quadrature-phase optical data modulators to modulate an optical carrier;
a polarization combiner to combine the modulated optical carriers from the optical data modulators into a polarization multiplexed, data-modulated optical carrier; and
an electronic driver connected to electrically drive said optical data modulators according to a constellation for which data symbols have parts transmitted on both polarization components of the data-modulated optical carrier, the transmitted data-modulated optical carrier having about a same total light intensity in each optical modulation time slot of the optical data modulators;
wherein pairs of in-phase and quadrature-phase electric field coordinates of each of the polarization components of the data symbols are located on a preselected set of two or more concentric circles about an origin, the constellation having four times an integer dimensions; and
wherein each pair of the data symbols having adjacent pairs of the in-phase and quadrature-phase electric field coordinates of one of the polarization components on one of the circles has pairs of the in-phase and quadrature-phase electric field coordinates of the other of the polarization components at or near diametrically opposite points on one of the circles.

15. The coherent optical data transmitter of claim 14, wherein for the pairs of in-phase and quadrature-phase electric field coordinates of the polarization components the preselected set includes at least three of the concentric circles.

16. The coherent optical data transmitter of claim 14, wherein for the pairs of in-phase and quadrature-phase electric field coordinates of the polarization components the preselected set includes at least four of the concentric circles.

17. The coherent optical data transmitter of claim 14, wherein each data symbol has parts on two or more consecutive ones of the optical modulation time slots.

18. The coherent optical data transmitter of claim 17, wherein for the pairs of in-phase and quadrature-phase electric field coordinates of each of the polarization components the preselected set includes at least three of the concentric circles.

19. The coherent optical data transmitter of claim 17, wherein for the pairs of in-phase and quadrature-phase electric field coordinates of each of the polarization components the preselected set includes at least three of the concentric circles.

20. The coherent optical data transmitter of claim 14, wherein the pairs of in-phase and quadrature-phase electric field coordinates of the different polarization components of individual ones of the data symbols are on circles with different size diameters.

21. A coherent optical data transmitter comprising:
two in-phase and quadrature-phase optical data modulators to modulate an optical carrier;
a polarization combiner to combine the modulated optical carriers from the optical data modulators into a polarization multiplexed, data-modulated optical carrier; and
an electronic driver connected to electrically drive said optical data modulators according to a constellation for which data symbols have parts transmitted on both polarization components of the data-modulated optical carrier, the transmitted data-modulated optical carrier having about a same total light intensity in each optical modulation time slot of the optical data modulators;
wherein pairs of in-phase and quadrature-phase electric field coordinates of each of the polarization components of the data symbols are located on a preselected set of two or more concentric circles about an origin, the constellation having four times an integer dimensions; and
wherein each pair of the data symbols of the constellation having pairs of the in-phase and quadrature-phase electric field coordinates of one of the polarization components at a same point on one of the circles has pairs of the in-phase and quadrature-phase electric field coordinates of the other of the polarization components at or near diametrically opposite points on one of the circles.

22. The coherent optical data transmitter of claim 21, wherein for the pairs of in-phase and quadrature-phase electric field coordinates of the polarization components the preselected set includes at least three of the concentric circles.

23. The coherent optical data transmitter of claim 21, wherein each data symbol has parts on two or more consecutive ones of the optical modulation time slots.

24. The coherent optical data transmitter of claim 23, wherein for the pairs of in-phase and quadrature-phase electric field coordinates of the polarization components the preselected set includes at least three of the concentric circles.

25. The coherent optical data transmitter of claim 21, wherein the pairs of in-phase and quadrature-phase electric field coordinates of the different polarization components of individual ones of the data symbols are on circles with different size diameters.

* * * * *